United States Patent
Farm et al.

(10) Patent No.: US 7,097,013 B2
(45) Date of Patent: Aug. 29, 2006

(54) HYDRODYNAMIC BRAKE

(75) Inventors: Johnny Farm, Hagersten (SE); Hans Jonsson, Sodertalje (SE); Gunnar Hermelin, Sodertalje (SE)

(73) Assignee: Scania CV AB (publ), (SE)

( * ) Notice: Subject to any disclaimer, the term of this patent is extended or adjusted under 35 U.S.C. 154(b) by 0 days.

(21) Appl. No.: 10/516,856

(22) PCT Filed: Jun. 13, 2003

(86) PCT No.: PCT/SE03/00987

§ 371 (c)(1),
(2), (4) Date: Dec. 3, 2004

(87) PCT Pub. No.: WO2004/005091

PCT Pub. Date: Jan. 15, 2004

(65) Prior Publication Data

US 2005/0155828 A1   Jul. 21, 2005

(30) Foreign Application Priority Data

Jul. 3, 2002   (SE) .................................... 0202085

(51) Int. Cl.
*F16D 57/02* (2006.01)
(52) U.S. Cl. ....................... 188/296; 188/290; 192/3.23
(58) Field of Classification Search ................ 188/290, 188/291, 296; 192/3.23
See application file for complete search history.

(56) References Cited

U.S. PATENT DOCUMENTS

| | | | | |
|---|---|---|---|---|
| 2,496,497 A | * | 2/1950 | Russell .................... | 188/274 |
| 3,297,114 A | * | 1/1967 | Erdman et al. ............. | 188/296 |
| 3,334,711 A | * | 8/1967 | Anderson ................... | 188/271 |
| 3,482,659 A | * | 12/1969 | Knapp et al. ............... | 188/274 |
| 3,888,335 A | * | 6/1975 | Hanke ........................ | 188/290 |
| 4,276,970 A | * | 7/1981 | Herrmann et al. .......... | 188/296 |
| 4,321,990 A | * | 3/1982 | Koch, Jr. ................... | 192/13 R |
| 4,324,320 A | * | 4/1982 | Spurlin et al. ............. | 188/271 |
| 4,480,728 A | * | 11/1984 | Bailey et al. ............... | 188/271 |
| 4,711,328 A | * | 12/1987 | Bazilio et al. ............. | 188/296 |
| 4,773,513 A | * | 9/1988 | Herrmann et al. .......... | 188/296 |
| 5,090,523 A | * | 2/1992 | Vogelsang .................. | 188/296 |
| 5,771,997 A | * | 6/1998 | Friedrich et al. ........... | 188/296 |
| 6,234,285 B1 | | 5/2001 | Friedrich et al. | |

FOREIGN PATENT DOCUMENTS

| | | |
|---|---|---|
| EP | 0 812 746 | 12/1997 |
| EP | 0 970 860 | 1/2000 |

\* cited by examiner

*Primary Examiner*—Robert A. Siconolfi
(74) *Attorney, Agent, or Firm*—Ostrolenk Faber Gerb & Soffen, LLP

(57) ABSTRACT

The present invention relates to a hydrodynamic brake which comprises a stator, a rotor, a toroidal space defined by the stator and the rotor, a medium which is intended to be supplied to the toroidal space when the brake is activated, and a multiplicity of components for allowing regulation of the flow of the medium to and from the toroidal space. The hydrodynamic brake incorporates a structure with a multiplicity of recesses which each have an opening in a substantially common plane and each is intended to accommodate one of the components.

11 Claims, 1 Drawing Sheet

HYDRODYNAMIC BRAKE

BACKGROUND TO THE INVENTION, AND STATE OF THE ART

The invention relates to a hydrodynamic brake and particularly to structures housing components of the brake.

Hydrodynamic brakes such as retarders incorporate not only a stator and a rotor but also a number of components which are necessary for ensuring proper functioning of the retarder. Such components may comprise valves of various kinds which regulate the oil flow in a number of pipe circuits for the retarder. Another component is a pump (which may be a gear pump) which is required for transferring oil from an oil sump. A further component is an accumulator which caters for rapid filling of the retarder when necessary. Conventional retarders are usually constructed in such a way that the majority of said components are relatively dispersed in the retarder. This renders the fitting and servicing of components of a conventional retarder laborious and relatively complicated.

SUMMARY OF THE INVENTION

The object of the present invention is to provide a hydrodynamic brake which is so constructed that the majority of the brake's constituent components are very easily accessible so that fitting and servicing become easy and take relatively little time.

This object is achieved with the hydrodynamic brake of the invention which relates to a hydrodynamic brake which comprises a stator, a rotor, and a toroidal space defined by the stator and the rotor. A medium is intended to be supplied to the toroidal space when the brake is activated. A multiplicity of components allow regulation of the flow of the medium to and from the toroidal space. The hydrodynamic brake incorporates a structure with a multiplicity of recesses each having an opening in a side thereof, e.g. in a substantially common plane and each recess is intended to accommodate one of the components. The fact that the hydrodynamic brake comprises a structure with a multiplicity of recesses which have openings arranged in a substantially common plane renders these components very easily accessible. Dismantling the hydraulic brake for access to such a plane which incorporates recesses for the various components can be made very simple and involve only a small number of working operations. It becomes easy to remove the components from the recesses and check them and, where necessary, substitute new ones. The fitting and servicing of the components arranged in such recesses can thus be done quickly and easily.

According to a preferred embodiment of the present invention, said structure is incorporated in a first element of the hydrodynamic brake, and a second element of the hydrodynamic brake is detachably fittable along a connecting region to the first element so that said elements in a fitted state form a housing which entirely surrounds said components. Access to said plane is then by removing the second element, which can be done in a relatively uncomplicated manner by using suitable fastenings. With advantage, the connecting region has an extent in said plane. Removal of the second element provides immediate access to said spaces which accommodate the various components. A gasket is preferably arranged in the connecting region between said first and second elements of the housing. Such a gasket results in a sealed housing which surrounds said components and prevents the enclosed medium from leaking out.

According to another preferred embodiment of the present invention, at least one of said components is a valve means. A hydrodynamic brake incorporates a number of valves of various kinds which are necessary for the functioning of the hydrodynamic brake. With advantage, substantially all such valves are arranged in spaces which have an opening in said plane. Such valves may comprise a regulating valve, a safety valve and check valves with various functions. One of said components may be a gear pump. A gear pump is of simple design and can with advantage be arranged in such a space. Another of said components may be an accumulator. In this case the recess may be of an appropriate shape for storing the medium at high pressure.

According to another preferred embodiment of the present invention, the hydrodynamic brake incorporates a storage space for the medium. As the first element and the second element form a completely sealed enclosure of said components, it is advantageous that a storage space for the medium be incorporated in said housing. The medium is preferably an oil and the storage space may therefore be described as an oil sump. With advantage, the first element incorporates the stator and the rotor, and the second element is of cover-like design. In this case the cover-like second element may be easily detachable from the first element so as to provide access to said recesses. The first element and the second element may be mouldings made of a suitable material. The first element may have moulded recesses with a shape entirely adapted to the specific components to be accommodated in the recesses. The first element preferably incorporates at least one duct to allow transfer of the medium. The first element may incorporate a structure which comprises, adjacent to the recesses, a multiplicity of readymade ducts for transfer of the medium. There is thus substantially no need to arrange any separate ducts for allowing transport of the medium in the first element.

BRIEF DESCRIPTION OF THE DRAWING

A preferred embodiment of the invention is described below by way of example with reference to the attached drawing, in which.

DETAILED DESCRIPTION OF A PREFERRED EMBODIMENT OF THE INVENTION

Figure 1:
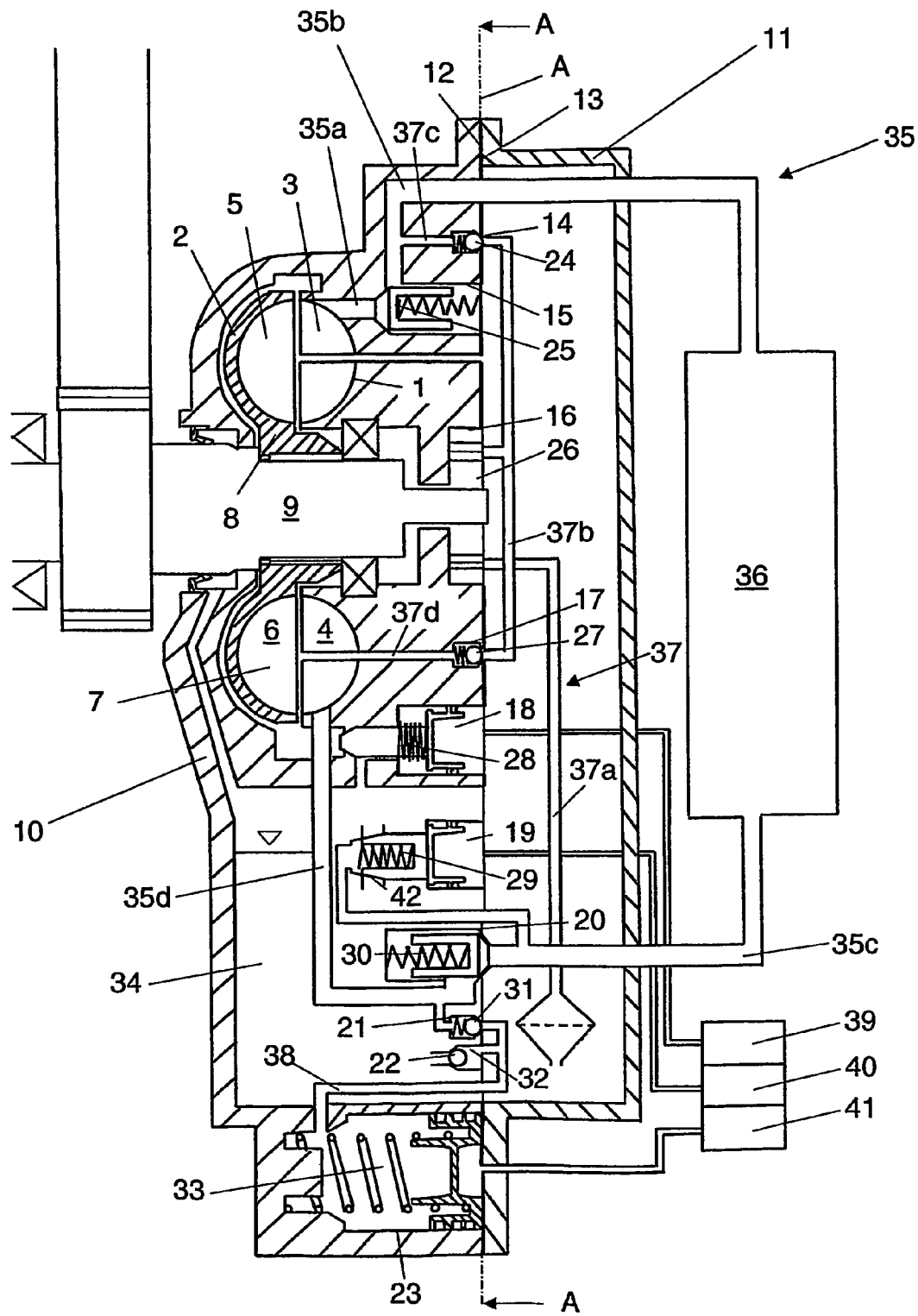
FIG. 1 depicts a section through a retarder according to the present invention.

FIG. 1 depicts a hydrodynamic brake in the form of a retarder of a powered vehicle. The retarder comprises a stator 1 and a rotor 2. The stator 1 has an annular shell 3 with a multiplicity of blades 4 arranged at uniform spacing along the annular shell 3. The rotor 2 is of corresponding design with an annular shell 5 which incorporates a multiplicity of blades 6 likewise arranged at uniform spacing along the annular shell 5. The respective shells 3, 5 of the stator 1 and rotor 2 are coaxially arranged with respect to one another so that they together form a toroidal space 7. The rotor 2 incorporates a shaft portion 8 which is firmly connected to a rotatable shaft 9. The rotatable shaft 9 is itself connected to an appropriate driveshaft of the vehicle's driveline. The rotor 2 will thus rotate together with the vehicle's driveline.

The retarder depicted in FIG. 1 incorporates a housing which comprises a first element 10 and a second element 11. The first element 10 incorporates a body in which inter alia the stator 1 and the rotor 2 are arranged. The second element 11 is of cover-like design and can be fitted detachably along a connecting region 12 to the first element 10 so that in a fitted state they form a closed housing. In the connecting region 12, a gasket 13 is arranged so that the housing forms a sealed enclosure. The first element 10 incorporates a multiplicity of recesses 14–23 which each have an opening in a substantially common plane A represented by the broken line A—A in FIG. 1. The connecting region 12 of the first element 10 and second element 11 also has an extent in said plane A.

The recesses 14–23 are each designed to accommodate a component which forms part of the retarder. The shape and size of the recesses 14–23 are adapted to the respective specific components which they accommodate. A first such recess 14 accommodates a first check valve 24. A second recess 15 accommodates an outlet check valve 25. A third recess 16 accommodates a gear pump 26. A fourth recess 17 accommodates a second check valve 27. A fifth recess 18 accommodates a dump (rapid emptying) valve 28. A sixth recess 19 accommodates a regulating valve 29. A seventh recess 20 accommodates an inlet check valve 30. An eighth recess 21 accommodates a filling valve 31. A ninth recess 22 accommodates an intake valve 32 for filling an accumulator 33. A tenth recess 23 accommodates said accumulator 33. The first element 10 and the second element 11 thus form a sealed housing which incorporates an oil sump 34 for storage of oil.

The retarder incorporates a first pipe circuit 35 with a first portion 35a which leads the oil from an outlet from the toroidal space 7 to the outlet check valve 25. A second portion 35b of the first pipe circuit leads the oil from the outlet check valve 25 to a heat exchanger 36 to cool the oil. A third portion 35c of the first pipe circuit leads the cooled oil to the inlet check valve 30 or alternatively to the regulating valve 29, depending on whether the retarder is or is not activated. A fourth portion 35d of the first pipe circuit leads the oil to an inlet to the toroidal space 7. The retarder incorporates a second pipe circuit 37 with a first portion 37a via which the oil is drawn from the oil sump 34 to the gear pump 26. A second portion 37b of the second pipe circuit 37 leads the oil to the first check valve 24 and the second check valve 27. When the retarder is not activated, the oil is led via the first check valve 24 and a third portion 37c of the second pipe circuit to the second portion 35b of the first pipe circuit. If the retarder is activated, the oil is led instead via the second check valve 27 and a fourth portion 37d of the second pipe circuit to an inlet to the toroidal space 7. The retarder also incorporates a third pipe circuit 38 which connects the accumulator 33 to a fourth portion 35d of the first pipe circuit. The third circuit 38 incorporates the filling valve 31 and the accumulator's intake valve 32. The first element 10 of the housing incorporates, adjacent to the recesses 14–23, occupied ducts which form part of the aforesaid pipe circuits 35, 37, 38.

A first control valve 39 is intended to control, by means of a control pressure, the operation of the safety valve 18 so that the toroidal space 7 can be quickly emptied of oil when necessary. A proportional valve 40 is intended to control, by means of a control pressure, the operation of the regulating valve 19 in order to activate the retarder and regulate the retarder's braking action. A second control valve 41 is intended to control, by means of a control pressure, the operation of the accumulator 33 so as to fill the toroidal space quickly with oil in order to effect a rapid braking action of the retarder. All of these three control valves 39, 40, 41 and the heat exchanger 36 are situated outside the housing.

When the vehicle's driver does not require the vehicle to be subjected to any braking action, the proportional valve 40 supplies no control pressure to the regulating valve 29, which opens fully so that any oil in the third portion 37c of the first pipe circuit drains away, via a passage 42, to the oil sump 34. This means that no oil runs past the inlet check valve 30, which requires relatively high oil pressure for it to open and lead oil to the toroidal space 7. As in this situation no oil is led to the toroidal space 7, substantially no braking action is effected other than a minor undesired braking action due to a so-called no-load loss caused by the rotor circulating the air present in the toroidal space 7.

The driveshaft 9 also drives the gear pump 26 which continuously pumps oil from the oil sump 34 during operation of the vehicle. From the gear pump 26, the oil is led at a positive pressure to the second portion 37b of the second pipe circuit. The first check valve 24 here has a spring with preloading such that it opens at a positive pressure of about 0.5 bar. The second check valve 27 has a spring with preloading such that it opens at a positive pressure of about 2 bar. When the regulating valve 29 is open, there is substantially no positive pressure in the first pipe circuit 35. This means that in the second portion 35b of the first pipe circuit there is no positive pressure which would otherwise increase the opening pressure for the first check valve 24. As the first check valve 24 opens at a lower pressure than the second check valve 27, the oil transferred from the oil sump 34 by the gear pump 26 is only led via the first check valve 24 and the third portion 37c of the second pipe circuit to the second portion 35b of the first pipe circuit, which is thus situated after the toroidal space 7 in the direction of flow of the oil. Thereafter the oil is led back to the oil sump 34 via the heat exchanger 36, the third portion 35c of the first pipe circuit, and the regulating valve 29.

When the vehicle's driver requires the vehicle to be subjected to a braking action, the proportional valve 40 supplies the regulating valve 29 with a control pressure which is greater than the preloading of the inlet check valve 30. The second control valve 41 activates the accumulator 33 so that the latter, via the third pipe circuit 38 and the filling valve 31, leads oil at high pressure to the fourth portion 35d of the first pipe circuit and to the toroidal space 7. The accumulator 33 initiates oil supply by means of a positive pressure to bring about rapid filling of the toroidal space 7 and thereby effect a corresponding rapid braking action of the retarder. After the circulation of the oil in the toroidal space 7, the oil is led out at high pressure via an outlet from the stator 1 to the first portion 35a of the first pipe circuit The outlet check valve 25 is opened by the high oil pressure and the oil is led to the second portion 35b of the first pipe circuit. At this stage the oil is at a positive pressure of at least 5 bar. The oil in the second portion 35b of the first pipe circuit is also led into the third portion 37c of the second pipe circuit and exerts there a pressure action urging the first check valve 24 towards a closed position. The opening pressure required for the first check valve 24 will thus be higher than the corresponding opening pressure for the second check valve 27 which had a preloading of about 2 bar. This means that all of the oil transferred by the gear pump 26 from the oil sump 34 will be led via the second check valve 27 and the fourth portion 37d of the second pump circuit to an inlet to the toroidal space 7.

The inlet to the toroidal space 7 is with advantage arranged centrally in the toroidal space 7.1. In the central part of the toroidal space a relatively low pressure prevails in substantially all operating states. Using a separate pipe portion 37d to supply the oil from the oil sump 34 at atmospheric pressure to the toroidal space 7 means that this oil need not be pumped up to the high pressure which prevails in the fourth portion 35*d* of the first pipe circuit. A less expensive gear pump 26 with a smaller pump capacity can therefore be used. The fourth portion 37*d* of the second pipe circuit may also be of relatively simple design since it need only be dimensioned to carry oil at a relatively small positive pressure.

The oil is led from the second portion 35*b* of the first pipe circuit to the heat exchanger 36, in which it is cooled. The braking action of the retarder is regulated by the control pressure from the proportional valve 40. The position of the regulating valve 29 is adjusted by means of the control pressure from the proportional valve 40 so that a certain proportion of the cooled oil after the heat exchanger 36 is led back to the oil sump 34, while the remainder is led past the inlet check valve 30 to the toroidal space 7. The result is regulation of the amount of oil circulating in the toroidal space 7 so as to effect a desired braking action.

The fact that the retarder incorporates a structure with a multiplicity of recesses 14–23 which have openings arranged in a substantially common plane A renders these components 24–33 very easily accessible. Removing the cover-like second element 11 from the first element 10 provides immediate access to the various components 24–33 arranged in the recesses 14–23, without further dismantling work, since the openings of all the recesses 14–23 are situated in a substantially common plane A. This means that the components 24–33 can easily be taken out and serviced or replaced as necessary. In a fitted state, the gasket 13 in the connecting region 12 between the first element 10 and the second element 11 prevents oil in the sump 34 from leaking out. The elements 10, 11 may be made of a suitable material by, for example, a moulding process. The recesses 14–23 may be of specific shape and size appropriate to the respective components 24–33 to be accommodated in the space 14–23.

The invention is in no way limited to the embodiment described but may be varied freely within the scopes of the claims.

The invention claimed is:

1. A hydrodynamic brake comprising:
    a stator which has an annular shell with a multiplicity of blades supported in the respective shell;
    a rotor which has a corresponding annular shell with a number of blades also supported in the respective shell; the annular shells of the rotor and the stator are so shaped and arranged that they form a toroidal space in which the blades extend for receiving a medium which is intended to be supplied to the toroidal space for effecting a braking action between the rotor and the stator when the medium is supplied to the space;
    a number of components for allowing regulation of the flow of the medium into or out of the space; and
    a housing having a first side accommodating the rotor and stator and including at least three recesses formed in the first side, wherein each recess provides an opening to accommodate one of the components and including a second side which is detachably connected to the first side along a connecting region so that the first side and second side together form the housing and surround the rotor, the stator, and the components and enclose the recesses of the first side of the housing.

2. A hydrodynamic brake according to claim 1 further comprising a gasket arranged in the connecting region between the first and second sides of the housing.

3. A hydrodynamic brake according to claim 1, wherein one of the components is a valve.

4. A hydrodynamic brake according claim 1, wherein one of the components is a gear pump.

5. A hydrodynamic brake according to claim 1, wherein one of the components is an accumulator.

6. A hydrodynamic brake according to claim 1, wherein the hydrodynamic brake incorporates a storage space for the medium.

7. A hydrodynamic brake according to claim 1, wherein the first side of the housing incorporates the stator and the rotor and the second side of the housing is a cover over the first side.

8. A hydrodynamic brake according to claim 1, wherein the first side of the housing incorporates in its structure at least one duct to allow transfer of the medium.

9. A hydrodynamic brake according to claim 1, wherein each of the components is received in one of the recesses to be accessible from the side of the housing.

10. A hydrodynamic brake according to claim 1, wherein the first side of the housing with the recesses therein is in a substantially common plane.

11. A hydrodynamic brake according to claim 10, wherein the connecting region is adjacent to the common plane.

* * * * *